(12) United States Patent
Banks

(10) Patent No.: US 9,186,782 B2
(45) Date of Patent: Nov. 17, 2015

(54) BEVEL GEAR REMOVAL APPARATUS

(75) Inventor: David P. Banks, Lake Stevens, WA (US)

(73) Assignee: THE BOEING COMPANY, Chicago, IL (US)

(*) Notice: Subject to any disclaimer, the term of this patent is extended or adjusted under 35 U.S.C. 154(b) by 1956 days.

(21) Appl. No.: 12/389,621

(22) Filed: Feb. 20, 2009

(65) Prior Publication Data

US 2010/0212135 A1 Aug. 26, 2010

(51) Int. Cl.
*B25B 13/06* (2006.01)
*B25B 21/00* (2006.01)
*B23P 19/04* (2006.01)
*B25B 27/14* (2006.01)

(52) U.S. Cl.
CPC ............... *B25B 21/002* (2013.01); *B23P 19/04* (2013.01); *B25B 13/065* (2013.01); *B25B 27/14* (2013.01); *Y10T 29/49822* (2015.01)

(58) Field of Classification Search
CPC .................................................... B25B 13/065
USPC .......................................................... 81/121.1
See application file for complete search history.

(56) References Cited

U.S. PATENT DOCUMENTS

| | | | | |
|---|---|---|---|---|
| 3,161,090 A | * | 12/1964 | McLellan | 81/53.2 |
| 3,996,819 A | * | 12/1976 | King | 81/124.6 |
| 4,242,931 A | | 1/1981 | Clement | |
| 5,551,320 A | * | 9/1996 | Horobec et al. | 81/53.2 |
| 5,901,620 A | | 5/1999 | Arnold | |
| 6,047,620 A | * | 4/2000 | Kozak et al. | 81/441 |
| 6,339,976 B1 | * | 1/2002 | Jordan | 81/53.2 |
| 6,598,498 B1 | * | 7/2003 | Pigford et al. | 81/53.2 |

* cited by examiner

*Primary Examiner* — Bryan R Muller
(74) *Attorney, Agent, or Firm* — Yee & Associates, P.C.

(57) ABSTRACT

The apparatus comprises a housing and a plurality of complementary linking features. The housing has a first end, a second end, an opening in the first end, and a channel in communication with the opening. The channel extends into the housing towards the second end. The plurality of complementary linking features is located on a wall of the channel. The channel and the plurality of complementary linking features are capable of receiving and engaging a plurality of linking features for a gear.

3 Claims, 6 Drawing Sheets

BEVEL GEAR REMOVAL APPARATUS

BACKGROUND INFORMATION

1. Field

The present disclosure relates generally to tools and, in particular, to tools containing gears. Still more particularly, the present disclosure relates to a method and apparatus for removing a gear from a tool.

2. Background

Tools may take the form of powered mechanical devices. A tool may be, for example, without limitation, a lathe, a milling machine, a drill, a grinder, and/or some other suitable type of tool. Tools may be used in fabricating structures as well as used during maintenance of objects. These structures may include, for example, an aircraft, an engine, a wing, a wheel, and/or some other suitable structure.

Many mechanical tools include gears. Depending on the construction and arrangement, gears may be used to transmit forces at different torques, speeds, and/or directions from the device turning the first gear.

A gear is a component that may transmit rotational force to another gear and/or device. A gear may be a round wheel that has linking features that may mesh with linking features in other gears and/or devices. These linking features may be referred to as teeth and/or cogs.

With drills, an air motor may be present that may transfer rotations from one speed to another speed. For example, an air motor for a drill may rotate at around 20,000 revolutions per minute. This speed may be reduced to perform drilling operations. For example, the speed may be a speed of around 1,500 revolutions per minute through a gear system. The gear system may be located in a case or other suitable object.

The output of this gear system may take the form of a bevel gear. This bevel gear may engage a gear in another portion of the drill to change the direction of rotation.

A bevel gear may be a conically-shaped device in which the linking features may take the form of teeth. The teeth may be straight cut, have a spiral bevel, have a zero bevel, or have some other shape.

Occasionally, maintenance may be performed on the gear system for the drill. For example, without limitation, debris may be present within the gear system, lubrication may be needed, and/or some other maintenance operation may need to be performed on components in the gear system.

Currently, when disassembling the gear system, the bevel gear is removed to provide access to the other components within the gear system. Removing this bevel gear is currently performed using a pipe wrench that may engage the linkage features in the bevel gear. This pipe wrench, however, may bend, crush, cause plastic deformation, and/or otherwise damage the bevel gear. As a result, when removing the bevel gear to access other components within the gear system, the bevel gear often may require replacement.

This type of operation increases the cost of maintenance for a drill. As a result, the expense in manufacturing products also may increase. Further, in some cases, a replacement bevel gear may be unavailable. As a result, the drill is unusable until a replacement bevel gear is obtained. As a result, delays and/or reduced throughput in manufacturing objects may occur.

Therefore, it would be advantageous to have a method and apparatus that takes into account one or more of the issues discussed above, as well as possibly other issues.

SUMMARY

In one advantageous embodiment, a bevel gear removal system comprises a housing and grooves. The housing has a first end, a second end, an opening in the first end, and a channel in communication with the opening. The channel extends into the housing towards the second end. The channel is capable of receiving a bevel gear. The grooves are located in a wall of the channel. A shape of the channel and the grooves are capable of receiving and engaging helical teeth for a spiral bevel gear. Rotation of the spiral bevel removes the spiral bevel gear.

In another advantageous embodiment, an apparatus comprises a housing and a plurality of complementary linking features. The housing has a first end, a second end, an opening in the first end, and a channel in communication with the opening. The channel extends into the housing towards the second end. The plurality of complementary linking features is located on a wall of the channel. The channel with the plurality of complementary linking features is capable of receiving and engaging a plurality of linking features for a gear.

In yet another advantageous embodiment, a method is present for removing a gear. A gear removal socket is positioned to engage the gear. The gear has a plurality of linking features. The gear removal socket comprises a housing and a plurality of complementary linking features. The housing has a first end, a second end, an opening in the first end, and a channel in communication with the opening. The channel extends into the housing towards the second end. The plurality of complementary linking features is located on a wall of the channel. The channel with the plurality of complementary linking features is capable of receiving and engaging the plurality of linking features for the gear to engage the gear attached to an object. The gear removal socket engaged to the gear is rotated to detach the gear from the object.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
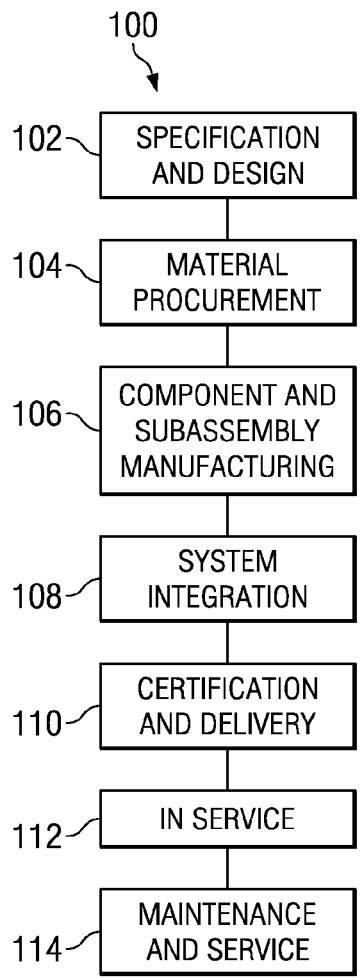
FIG. 1 is an illustration of an aircraft manufacturing and service method in accordance with an advantageous embodiment.
Figure 2:
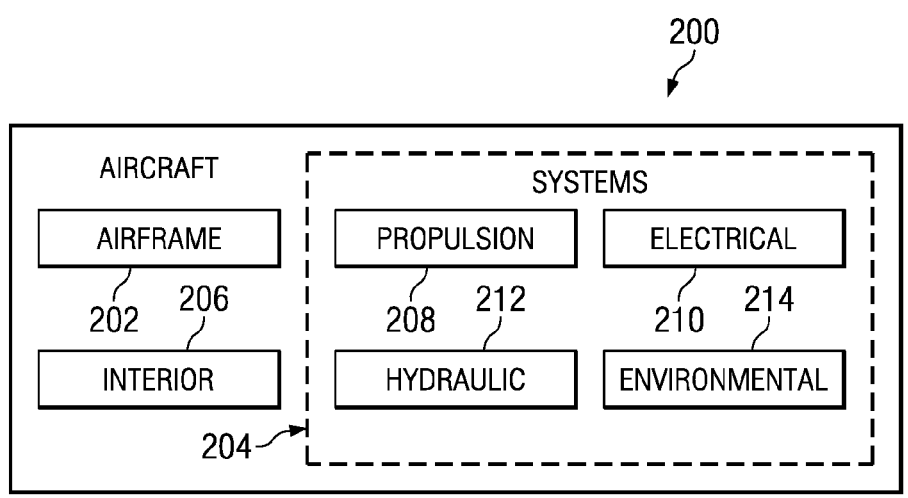
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize and take into account that currently used mechanisms for removing bevel gears may cause damage to the linking features on those bevel gears. The different advantageous embodiments recognize and take into account that even though a small number of gears may be damaged, the gear itself may need to be replaced.

The different advantageous embodiments recognize and take into account that it would be desirable to have an approved method and apparatus to remove bevel gears in a manner that avoids damaging the gears. The different advantageous embodiments provide an apparatus that comprises a housing and a plurality of complementary linking features. The housing has a first end, a second end, and an opening in the first end.

The opening in the first end of the housing provides communication with a channel that extends into the housing towards the second end of the housing. The complementary linking features are located on the wall of a channel inside of the housing. These complementary linking features are capable of receiving and engaging a plurality of linking features for a bevel gear. This engagement may be made in a manner that avoids bending, damaging, or otherwise modifying the bevel gear in a manner that makes the bevel gear unsuitable for use.

Figure 3:
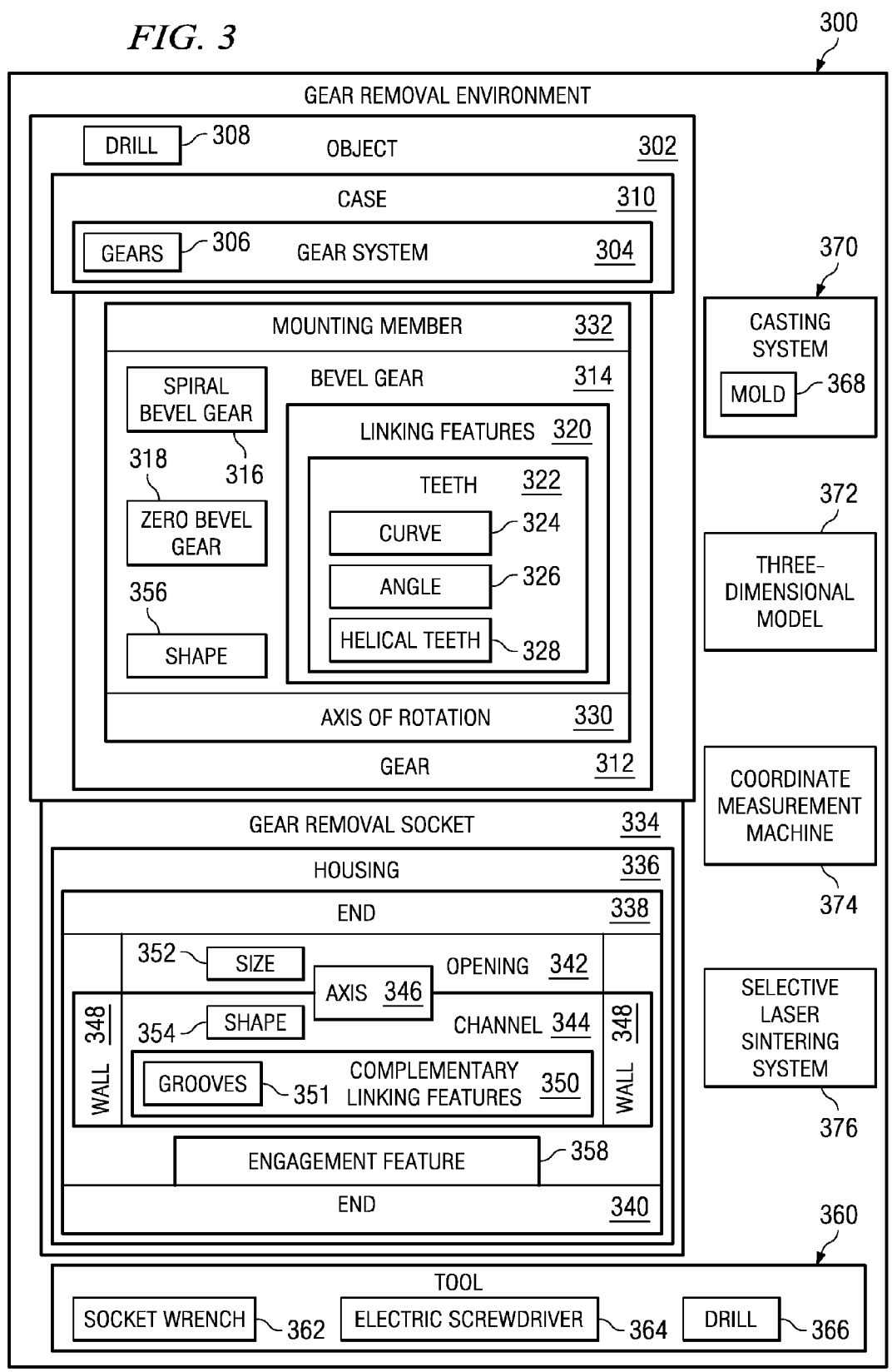
FIG. 3 is an illustration of a gear removal environment in accordance with an advantageous embodiment.

Turning now to FIG. 3, an illustration of a gear removal environment is depicted in accordance with an advantageous embodiment. In this illustrative example, gear removal environment 300 may include object 302. Object 302 may be, for example, a tool, device, subsystem, and/or any suitable structure that may contain gear system 304. Gear system 304 contains gears 306. Gears 306 may provide a capability to transmit rotational force to another gear or device connected to gear system 304.

In the illustrative examples, object 302 may take the form of drill 308. In this illustrative example, gear system 304 may be located in case 310. Case 310 provides a cover and/or housing for gears 306 within gear system 304. In this illustrative example, access to one or more gears in gear system 304 inside of case 310 may require removal of gear 312.

In particular, gear 312 may take the form of bevel gear 314 in these illustrative examples. Bevel gear 314 may take various forms. For example, bevel gear 314 may be spiral bevel gear 316, zero bevel gear 318, and/or some other type of bevel gear. Bevel gear 314, regardless of the type, has linking features 320. Linking features 320, in these illustrative examples, take the form of teeth 322. Teeth 322 may have curve 324 and/or angle 326.

When bevel gear 314 takes the form of spiral bevel gear 316, teeth 322 may be helical teeth 328. In other words, helical teeth 328 may have leading edges that are not parallel to axis of rotation 330. Instead, helical teeth 328 may be set at an angle relative to axis of rotation 330. With curve 324, helical teeth 328 may engage other gears more gradually, which may provide a smoother and/or quieter operation.

In these illustrative examples, removal of bevel gear 314 may require rotation of bevel gear 314 around axis of rotation 330 in a manner that allows mounting member 332 to become disengaged from other components within gear system 304. Mounting member 332 may be a male or female mounting member in these examples. Further, mounting member 332 may be engaged and/or disengaged from other components through threads that may be present on mounting member 332. For example, without limitation, mounting member 332 may be coupled to a shaft from a gear within gear system 304. With this type of example, mounting member 332 may take the form of a post with threads that may engage threads in a channel within a shaft for a gear within gear system 304.

Gears 306 within gear system 304 may be held and/or locked in place to allow for rotating of bevel gear 314 around axis of rotation 330 in a manner that allows for mounting member 332 to be disengaged.

In the illustrative embodiments, bevel gear 314 may be exposed in case 310 in a manner that requires engagement of linking features 320 in bevel gear 314 to remove bevel gear 314.

In the different advantageous embodiments, gear removal socket 334 may be used to engage and remove bevel gear 314 from case 310. Gear removal socket 334, in this illustrative example, comprises housing 336. Housing 336 has end 338 and end 340. In this example, opening 342 may be present in end 338 with channel 344 in communication with opening 342. Channel 344 may extend from opening 342 inwards in housing 336 towards end 340. Channel 344 and opening 342 may be aligned along axis 346. Axis 346 may act as a center line to channel 344. For example, axis 346 may be substantially perpendicular to a plane through opening 342. Further, axis 346 may extend substantially centrally through channel 344.

Channel 344 has wall 348. Complementary linking features 350 are located on wall 348. In these illustrative examples, complementary linking features 350 may take the form of grooves 351. Each groove in grooves 351 is capable of receiving and engaging a tooth within teeth 322 for bevel gear 314. Channel 344 and complementary linking features 350 have shape 354, which is complementary to shape 356 of bevel gear 314. Opening 342 has size 352. Size 352 is selected to allow bevel gear 314 to enter channel 344.

The entry of bevel gear 314 into channel 344 may be such that linking features 320 for bevel gear 314 may engage complementary linking features 350 in housing 336. For example, grooves 351 may receive teeth 322 in a manner such that grooves 351 may engage and hold teeth 322 to allow for force to be applied to rotate bevel gear 314 around axis of rotation 330. Grooves 351 hold teeth 322 in a manner that reduces and/or prevents plastic deformation, bending, damage, and/or other undesirable alterations to teeth 322 when removing bevel gear 314.

End 340 has engagement feature 358. Engagement feature 358 may allow gear removal socket 334 to be attached to tool 360. Tool 360 may be, for example, without limitation, socket wrench 362, electric screwdriver 364, drill 366, or some other suitable type of tool that may be used to rotate gear removal socket 334. Tool 360 is capable of providing a force needed to remove bevel gear 314 from an object, such as gear system 304. This force may be applied through a human operator manipulating tool 360 and/or a motor in tool 360.

When gear removal socket 334 is engaged with bevel gear 314 and rotated, bevel gear 314 may be removed from gear system 304. In this manner, access to other gears in gears 306 in gear system 304 may be provided.

The removal of bevel gear 314 may be made in a manner that minimizes and/or prevents modification, bending, damage, and/or other changes to bevel gear 314 that may result in bevel gear 314 being unusable. Gear removal socket 334 also may be used to place bevel gear 314 back into gear system 304. In this manner, gear removal environment 300 allows for the removal of bevel gear 314 in a manner that reduces and/or avoids changes, modifications, damage, and/or other alterations to bevel gear 314 that may make bevel gear 314 unusable within object 302.

In these illustrative examples, bevel gear 314 may be considered unusable if bevel gear 314 does not allow object 302 to perform within expected thresholds and/or tolerances as designed. In other advantageous embodiments, bevel gear 314 may be unusable if bevel gear 314 cannot engage other gears or devices to transmit rotational force to the gear or devices.

In these different advantageous embodiments, gear removal socket 334 may be manufactured using bevel gear 314 as a model. For example, mold 368 may be created from bevel gear 314. Mold 368 may be used in casting system 370 to create gear removal socket 334.

In other advantageous embodiments, three-dimensional model 372 may be created from bevel gear 314. In this type of embodiment, measurements of bevel gear 314 may be made to create three-dimensional model 372. In these examples, three-dimensional model 372 may be a computer-aided design model.

Coordinate measurement machine 374 may be used to create the measurements for three-dimensional model 372. Coordinate measurement machine 374 may be, for example, without limitation, a laser tracking system. With three-dimensional model 372, selective laser sintering system 376 may be used to manufacture gear removal socket 334.

Of course, any suitable modeling, measurement, and/or manufacturing technique may be used to manufacture gear removal socket 334 in the different advantageous embodiments.

The illustration of gear removal environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented in FIG. 3 to illustrate some of the functional components that may be present in the different advantageous embodiments. In some advantageous embodiments, these functional blocks may be combined and/or divided into different blocks when implemented.

Housing 336 may be constructed from a number of different types of materials. For example, without limitation, housing 336 may be made of a material selected from steel, titanium, aluminum, copper, a metal alloy, ceramic, plastic, and/or some other suitable type of material.

For example, in some advantageous embodiments, gear removal socket 334 may not need engagement feature 358. Instead, gear removal socket 334 may be integral with a member or rod that may be used to rotate gear removal socket 334 around axis of rotation 330 when gear removal socket 334 is engaged with bevel gear 314. In yet other advantageous embodiments, tool 360 may be a robotic arm, a computer-controlled machine, or some other suitable tool.

Figure 4:
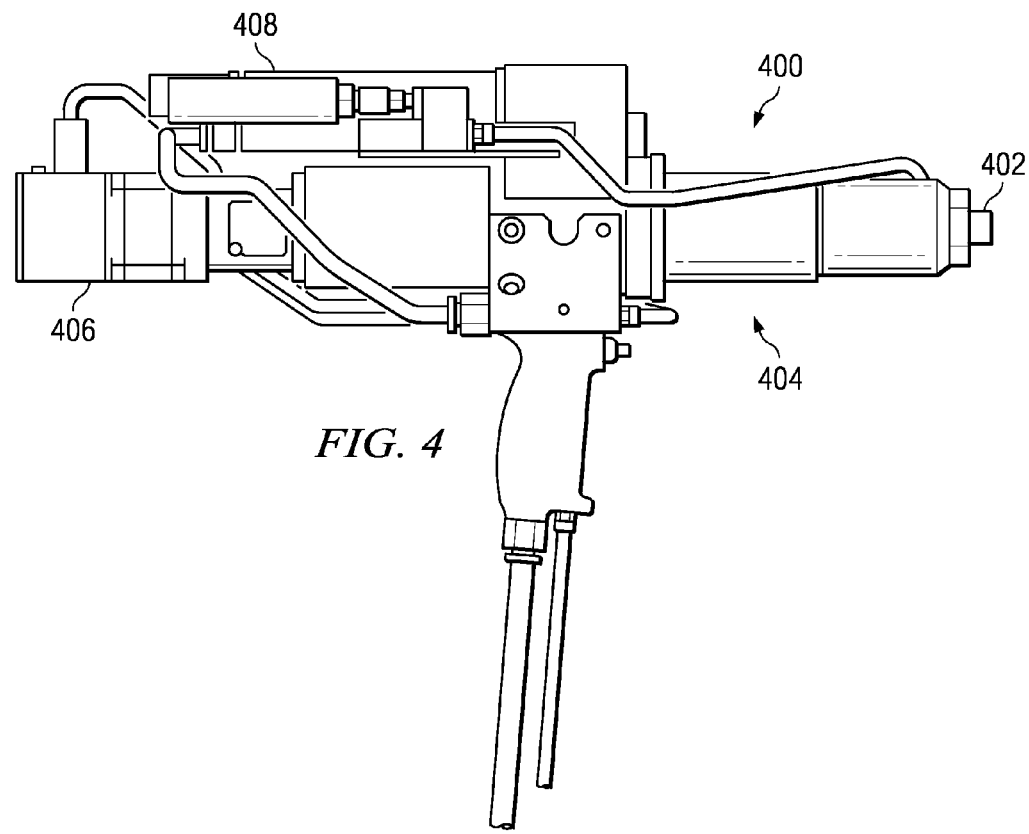
FIG. 4 is an illustration of a tool containing a bevel gear that may be removed with a gear removal socket in accordance with an advantageous embodiment.

With reference now to FIG. 4, an illustration of a tool containing a bevel gear that may be removed with a gear removal socket is depicted in accordance with an advantageous embodiment. Drill 400 is an example of one implementation for drill 308 in FIG. 3.

As illustrated, drill 400 includes drill spindle 402 within housing 404. Drill 400 also includes servo motor 406 and air motor unit 408. These two motors are externally mounted to housing 404 in these examples. Air motor unit 408 has a bevel gear that may be removed using a gear removal socket in accordance with an advantageous embodiment. This removal may occur without damaging the gear and requiring replacement of this gear.

Figure 5:
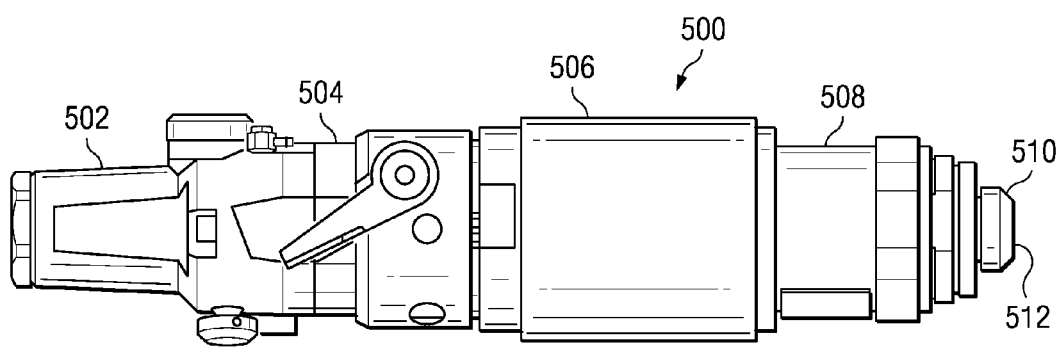
FIG. 5 is an illustration of an air motor unit in accordance with an advantageous embodiment.

Turning now to FIG. 5, an illustration of an air motor unit is depicted in accordance with an advantageous embodiment. In this illustrative example, air motor unit 500 is a more detailed example of air motor unit 408 in FIG. 4. In this illustrative example, air motor unit 500 may have air inlet 502, valve 504, air motor 506, and gear system 508. Gear system 508 may be used to change the number of revolutions per minute generated by air motor 506 to a lower rate in these illustrative examples.

The output component of gear system 508 is bevel gear 510. In this illustrative example, bevel gear 510 is a spiral bevel gear. Removal of bevel gear 510 is required, in this illustrative example, to access other components within gear system 508. In the illustrative examples, bevel gear 510 may be removed using a gear removal socket such as, for example, gear removal socket 334 in FIG. 3.

Removal of bevel gear 510 may require torque levels that may exceed around 200 foot pounds. The different advantageous embodiments avoid using currently available techniques that may damage linking features 512 on bevel gear 510. For example, plastic deformation, bending, and/or other modifications of linking features 512 may be avoided.

Figure 6:
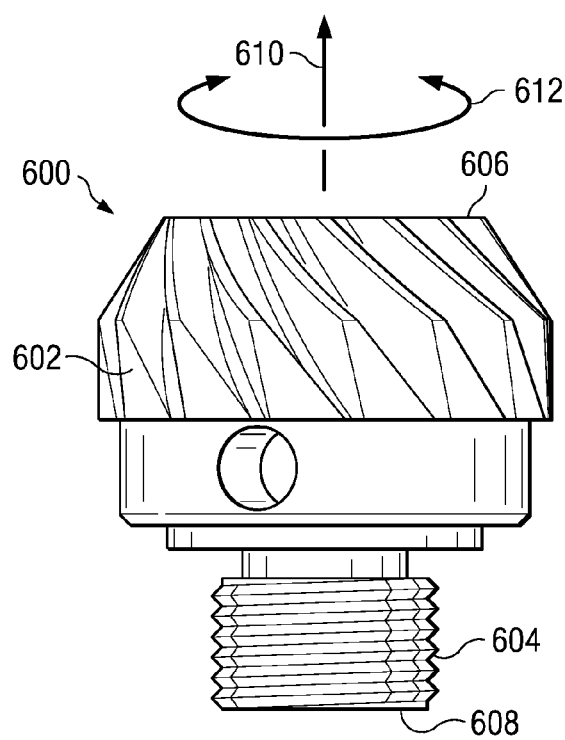
FIG. 6 is an illustration of a bevel gear in accordance with an advantageous embodiment.

Turning now to FIG. 6, an illustration of a bevel gear is depicted in accordance with an advantageous embodiment. In this illustrative example, bevel gear 600 is shown in a perspective view.

Bevel gear 600 has linking features 602 with spiral or helical teeth. In this example, threaded post 604 is an example of a mounting member used to attach bevel gear 600 to other components within a gear system. End 606 may be exposed, while end 608 may be secured to the gear system.

In this illustrative example, bevel gear 600 has axis of rotation 610. Bevel gear 600 may rotate around axis of rotation 610 as indicated by arrow 612.

Figure 7:
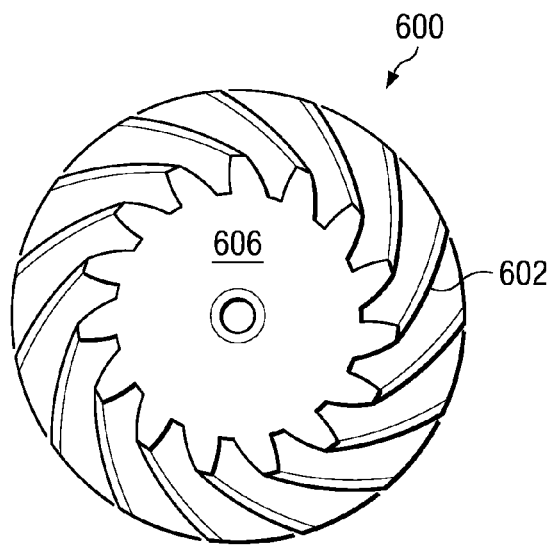
FIG. 7 is an illustration of one end of a bevel gear in accordance with an advantageous embodiment.

With reference now to FIG. 7, an illustration of one end of a bevel gear is depicted in accordance with an advantageous embodiment. In this example, a top view of end 606 is illustrated.

Figure 8:
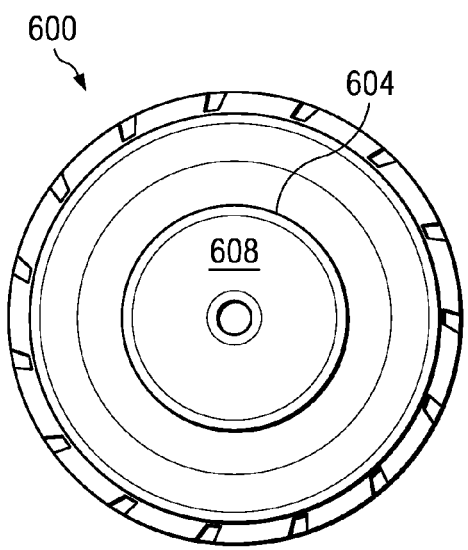
FIG. 8 is an illustration of a view of another end of a bevel gear in accordance with an advantageous embodiment.

Turning next to FIG. 8, an illustration of a view of another end of a bevel gear is depicted in accordance with an advantageous embodiment. In this example, a bottom view of end 608 is illustrated.

The different advantageous embodiments avoid plastic deformation, bending, modification, and/or other undesirable changes to linking features 602 on bevel gear 600 during removal of bevel gear 600 from a gear system.

Figure 9:
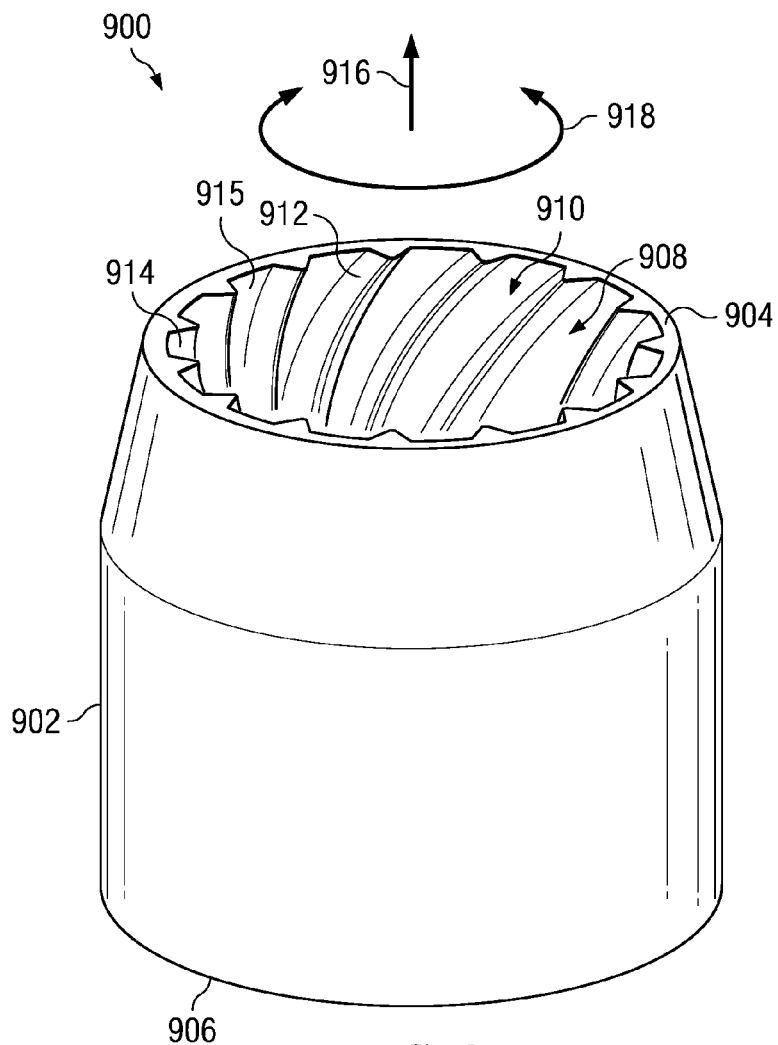
FIG. 9 is an illustration of a perspective view of a gear removal socket in accordance with an advantageous embodiment.

Turning now to FIG. 9, an illustration of a perspective view of a gear removal socket is depicted in accordance with an advantageous embodiment. Gear removal socket 900 is an example of one implementation of gear removal socket 334 in FIG. 3.

As illustrated, gear removal socket 900 has housing 902, end 904, and end 906. End 904 has opening 908 with channel 910. Within channel 910, complementary linking features 912 are present on wall 914 of channel 910. Complementary linking features 912 may be capable of engaging linking features in a bevel gear such as, for example, linking features 602 for bevel gear 600 in FIG. 6.

As can be seen, complementary linking features 912 may take the form of grooves 915. Each groove within grooves 915 is capable of receiving and holding a tooth within the teeth for a bevel gear. The grooves may receive and hold the teeth in a manner such that the teeth on the bevel gear may not be plastically deformed, bent, damaged, and/or otherwise altered during removal of the bevel gear.

In this illustrative example, gear removal socket 900 has axis 916. Axis 916 extends substantially centrally through channel 910. In this illustrative example, gear removal socket 900 may be rotated about axis 916 in the direction of arrow 918 during operation and/or use of gear removal socket 900.

With complementary linking features 912, a bevel gear may be turned around an axis of rotation, such as axis 916, to remove the bevel gear in a manner that reduces and/or eliminates plastic deformation, bending, alteration, and/or any other undesirable changes to the linking features in the bevel gear.

Figure 10:
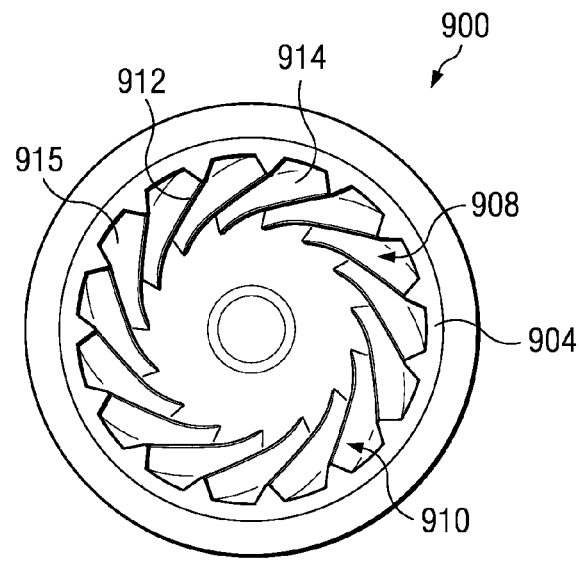
FIG. 10 is an illustration of a view of one end of a gear removal socket in accordance with an advantageous embodiment.

Turning now to FIG. 10, an illustration of a view of one end of a gear removal socket is depicted in accordance with an advantageous embodiment. In this example, a top view illustrating end 904 of bevel gear 900 is depicted in accordance with an advantageous embodiment.

Figure 11:
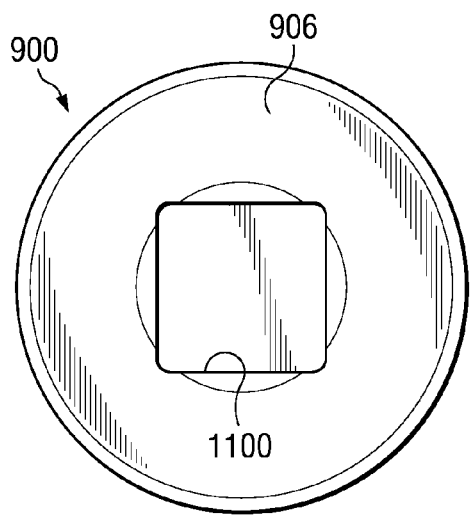
FIG. 11 is an illustration of a view of another end of a gear removal socket in accordance with an advantageous embodiment.

In FIG. 11, a view of another end of a gear removal socket is depicted in accordance with an advantageous embodiment. A bottom view of end 906 of gear removal socket 900 is depicted in accordance with an advantageous embodiment. In this view, engagement feature 1100 is present on end 906. Engagement feature 1100 is a rectangular channel within gear removal socket 900 that may allow attachment of gear removal socket 900 to a tool.

Figure 12:
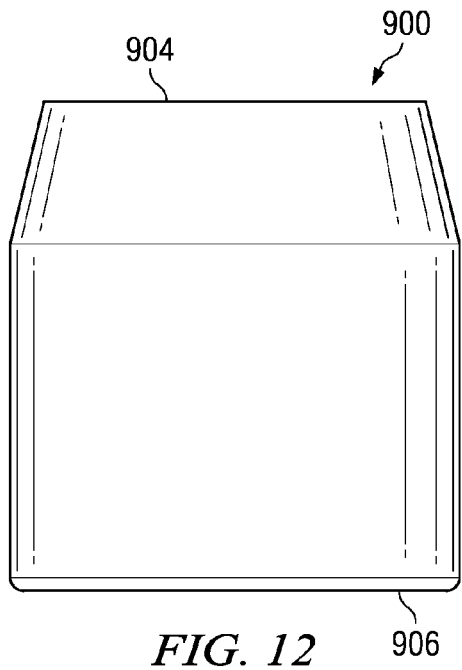
FIG. 12 is an illustration of a side view of a gear removal socket in accordance with an advantageous embodiment.

Turning now to FIG. 12, an illustration of a side view of a gear removal socket is depicted in accordance with an advantageous embodiment.

Figure 13:
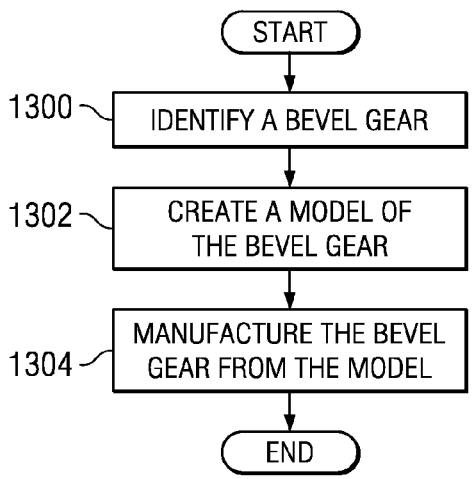
FIG. 13 is an illustration of a flowchart of a process for manufacturing a gear removal socket in accordance with an advantageous embodiment.

Turning now to FIG. 13, an illustration of a flowchart of a process for manufacturing a gear removal socket is depicted in accordance with an advantageous embodiment. The process illustrated in FIG. 13 may be used within gear removal environment 300 to create a tool, such as gear removal socket 334 in FIG. 3.

The process may begin by identifying a bevel gear (operation 1300). A model of the bevel gear may be created (operation 1302). This model may be, for example, a mold made from the bevel gear, a computer-aided design model made using measurements of the bevel gear, and/or some other suitable model. A three-dimensional model may be made of the bevel gear using laser measurements in these illustrative examples.

Thereafter, the bevel gear may be manufactured from the model (operation 1304). In these illustrative examples, the bevel gear may be manufactured using the mold and/or three-dimensional model of the bevel gear. If a mold is used, a bevel gear may be created through currently available techniques for casting and/or manufacturing components using molds. If a computer-aided design model is present, processes such as, for example, selective laser sintering, may be used to make the gear removal socket.

Figure 14:
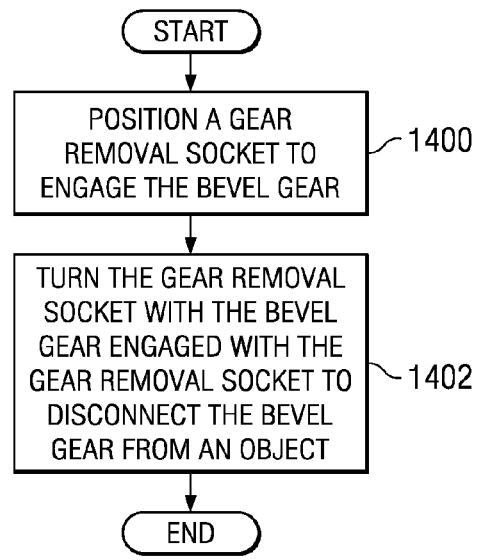
FIG. 14 is an illustration of a flowchart of a process for removing a bevel gear in accordance with an advantageous embodiment.

Turning now to FIG. 14, an illustration of a flowchart of a process for removing a bevel gear is depicted in accordance with an advantageous embodiment. The process illustrated in FIG. 14 may be implemented in an environment such as, for example, gear removal environment 300 in FIG. 3.

The process begins by positioning a gear removal socket to engage the bevel gear (operation 1400). In this example, the bevel gear has a plurality of linking features, and the gear removal socket comprises a housing having a first end, a second end, an opening in the first end, and a channel in communication with the opening. The channel extends into the housing towards the second end. A plurality of complementary linking features is located on the wall of the channel. The channel with the plurality of complementary linking features is capable of receiving and engaging the plurality of linking features for the bevel gear to engage the bevel gear.

With the bevel gear engaged with the gear removal socket, the gear removal socket may be turned to disconnect the bevel gear from an object (operation 1402). This object may be, for example, a gear system or some other suitable object.

This process may be performed without causing plastic deformation, bending, alterations, and/or some other undesirable changes to the bevel gear. In these examples, the gear removal socket may be turned using a tool such as, for example, without limitation, a socket wrench, an electric screwdriver, a drill, and/or some other suitable tool. A similar process may be performed to attach the bevel gear to an object.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in reverse order, depending on the functionality involved.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

For example, although the different advantageous embodiments are described with respect to different types of bevel gears, the different advantageous embodiments may be applied to other types of gears in addition to bevel gears. For example, the different advantageous embodiments may be used with internal gears, external gears, spur gears, helical gears, double helical gears, crown gears, hypoid gears, and/or other suitable types of gears.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A bevel gear removal socket system comprising:
   a housing having a first end, a second end, an opening in the first end, and a channel in communication with the opening, wherein the channel extends into the housing towards the second end and wherein the channel is configured to receive a bevel gear; and
   grooves located in a wall of the channel, wherein a shape of the channel and the grooves are configured to receive and engage helical teeth for a spiral bevel gear, wherein rotation of the spiral bevel gear removes the spiral bevel gear.

2. The bevel gear removal socket of claim 1, wherein the housing is comprised of a material selected from one of steel, aluminum, titanium, a metal alloy, plastic, and ceramic.

3. The bevel gear removal socket of claim 1, further comprising:
   a tool, wherein the tool is configured to be coupled to the second end of the housing and rotating the housing with a force needed to remove the bevel gear from an object.

\* \* \* \* \*